Patented Oct. 17, 1933

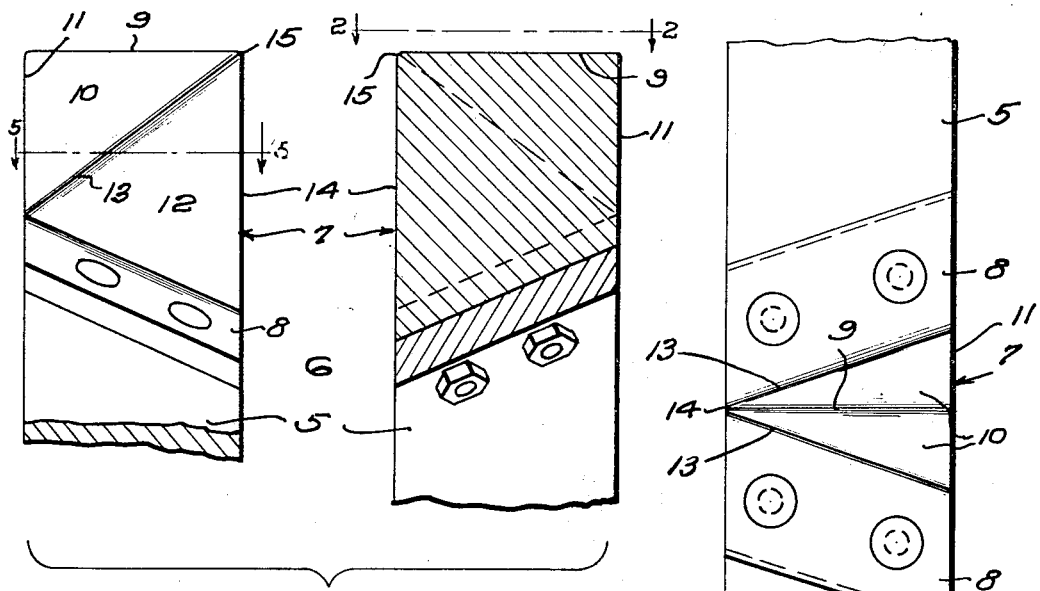

1,930,615

UNITED STATES PATENT OFFICE 1,930,615

SELF CLEANING LUG

Neal C. Harris and William N. Creps, Guide Rock, and Ford M. Blakeslee, Fairbury, Nebr.

Application August 16, 1932. Serial No. 629,068

3 Claims. (Cl. 301—44)

Our invention relates to improvements in lugs for use upon traction wheels of tractors, or the like.

An important object of the invention is to provide a traction lug which is self-cleaning, both in an inwardly and outwardly direction.

A further object of the invention is to provide a lug of the above-mentioned character, which is extremely simple in construction, strong and durable, and efficient in operation.

Other objects and advantages of the invention will be apparent during the course of the following description.

In the drawing, forming a part of this specification, in which like numerals are employed to designate like parts throughout the same, Figure 1 is a fragmentary plan view of a traction wheel, parts in section, and parts broken away, showing our traction lugs applied thereto, Figure 2 is a plan view of one of the traction lugs viewed from the line 2—2 of Figure 1, Figure 3 is an inner side elevation of the traction lug, Figure 4 is a perspective view of the same, Figure 5 is a horizontal section taken on line 5—5 of Figure 3, and, Figure 6 is an outer end elevation of the lug, parts broken away.

In the drawing, wherein for the purpose of illustration is shown a preferred embodiment of my invention, the numeral 5 designates spaced rim sections of a traction wheel, having a passage 6 between the same.

The numeral 7 designates the improved traction lug, having an attaching base 8, preferably formed integral therewith. When the lug is applied to the rim section 5, which is preferably inclined, the outer edge 9 of the lug is horizontally arranged, the base 8 being transversely inclined with respect to the edge 9, corresponding to the inclination of the rim section. The lug tapers radially outwardly, producing outwardly converging opposite faces 10. These faces 10 also converge outwardly horizontally, but do not meet, affording a flat triangular face 11. The lug also has oppositely arranged faces 12, which converge horizontally inwardly from inclined edges 13 to an inner vertical edge 14. The faces 12 also converge radially outwardly from the attaching base 8, to the inner point 15.

The attaching base is provided with any suitable number of openings 16, for receiving bolts, or the like, which are secured to the rim section 6. These lugs are applied to the rim section in suitably spaced relation. The faces 12 are radially longer than the faces 10, to compensate for the inclination of the base 8, and retain the outer pointed edge 9 substantially horizontal. By virtue of the horizontal and radial convergence of the faces 10 and 12, the lug is self-cleaning in an inward and outward direction, the dirt falling freely from the lug in either direction.

It is to be understood that the form of our invention herewith shown and described, is to be taken as the preferred example of the same, and that various changes in the shape, size and arrangement of parts may be resorted to without departing from the spirit of the invention, or the scope of the subjoined claims.

Having fully described our invention, what we claim is:

1. A traction wheel lug having outer oppositely arranged faces which converge radially outwardly and horizontally outwardly and inner oppositely arranged faces which converge radially outwardly and horizontally inwardly, the outer and inner faces meeting at transversely inclined edges, and an attaching base secured to the radially inner end of the lug.

2. A traction wheel lug having axially inner and outer sets of flat faces, the faces in each set converging radially outwardly and also converging horizontally outwardly, the faces in one set meeting at a relatively sharp edge and the faces in the other set terminating at spaced edges for providing a flat outer face, the faces of both sets meeting at inclined lines, the faces in one set being radially longer at their outer edge than the faces in the other set.

3. A traction wheel lug having outer and inner sets of faces, the faces of each set converging radially outwardly and also converging horizontally outwardly, the faces in both sets meeting at inclined lines, the faces in the inner set being radially longer at their outer edge than the faces in the outer set, and a transversely inclined attaching base secured to the radially inner end of the lug.

NEAL C. HARRIS.
WILLIAM N. CREPS.
FORD M. BLAKESLEE.